J. F. COOPER.
ANTISKIDDING DEVICE.
APPLICATION FILED MAR. 11, 1909.

949,113.

Patented Feb. 15, 1910.

WITNESSES:
John D. McLaughlin
J. W. Telle

INVENTOR
James F. Cooper
By E. E. Vrooman
ATTORNEY.

UNITED STATES PATENT OFFICE.

JAMES F. COOPER, OF PETALUMA, CALIFORNIA.

ANTISKIDDING DEVICE.

949,113.  Specification of Letters Patent.  Patented Feb. 15, 1910.

Application filed March 11, 1909. Serial No. 482,643.

*To all whom it may concern:*

Be it known that I, JAMES F. COOPER, citizen of the United States, residing at Petaluma, in the county of Sonoma and State of California, have invented certain new and useful Improvements in Antiskidding Devices, of which the following is a specification, reference being had therein to the accompanying drawing.

This invention relates to protectors for pneumatic tires, and has specially in view a plurality of resilient plates shaped to conform to the tire each plate having a flexible connection with the adjoining plate and being provided with longitudinal and transverse projections which will prevent slipping or skidding of the tire.

In carrying out the object of the invention generally stated above it will, of course, be understood that the essential features thereof are susceptible of changes in details and structural arrangements, one preferred and practical example of which is shown in the accompanying drawings wherein—

Figure 1:
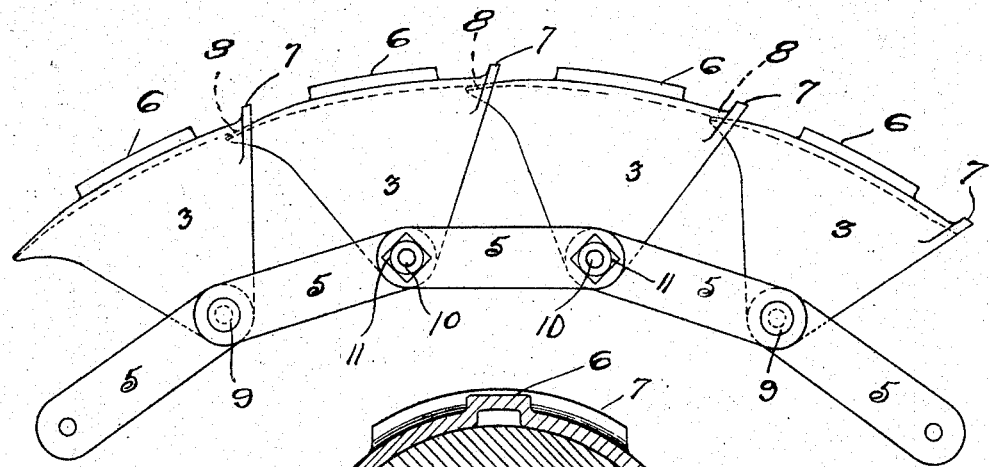
Figure 2:
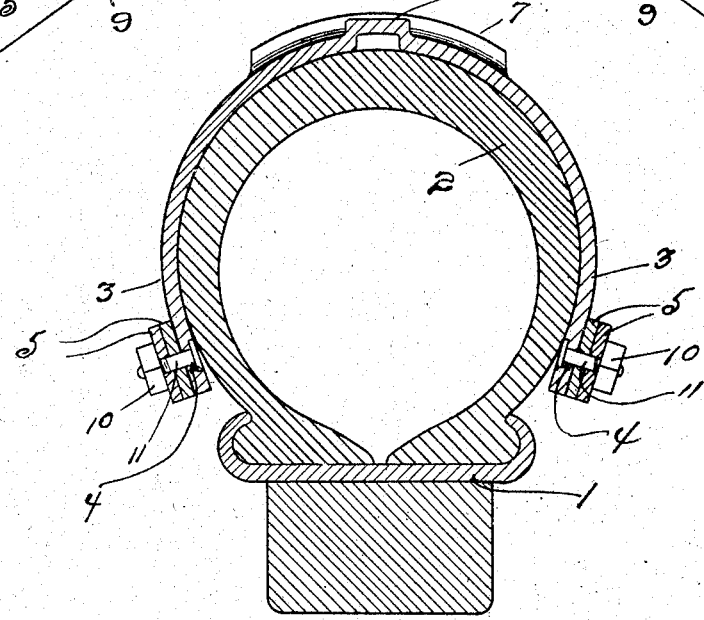

Figure 1 is a side elevation of a portion of the improved tire protector or armor. Fig. 2 is a transverse sectional view of a tire showing the same equipped with the present invention.

Referring to said drawings by numerals, 1 designates the rim of a wheel having an inflatable tire 2 thereon, the representation of the wheel rim and tire being a conventional one.

The improved protector or armor is composed of a plurality of metal plates which span the tread of the tire and project well down the sides thereof, said plates being preferably of a tapering formation at their sides as indicated at 3 and having an opening 4 formed through their sides adjacent to their pointed ends whereby each plate may be connected to the adjoining plate by means of a link 5. Each plate at its tread portion is provided with a raised or pressed protuberance 6 the top surface of which is flat and which is centrally located thereon and extends longitudinally of said tread. One edge portion of each plate is upturned to provide a gripping flange 7 and also to provide clearance space below it, as indicated at 8. for one end of the adjoining plate, so that when the complete protector or armor is in place upon the tire the plates will be in an overlapping position, as is indicated clearly in Fig. 1.

As will be seen by reference to Fig. 1, each plate at its side is connected with two of the links 5, said links being superposed thereon, and some of them are retained in engagement with the plates by means of rivets 9 while others are detachably held in engagement by means of nuts and bolts 10 and 11. This arrangement of fasteners provides for the ready removal of the protector when necessary or desirable.

It will be seen from the foregoing that through the described link connection of each plate, and the further fact that the plates are made of thin resilient material, the armor will not affect the resiliency of the tire, and as the intermediate longitudinally extending protuberance and the transversely arranged upturned gripping flange are integral with the plates, the same may be readily formed by a single operation of a suitable shaping or punching machine, thereby greatly cheapening the cost of the production of the protector. It will also be seen that as the plates are arranged in an overlapping position on the tire and extend well down the sides thereof, the tire will be effectually shielded from puncturing objects or articles, and also through the arrangement of a longitudinal protuberance on the tread and a transverse gripping flange on the edge of the plates, the danger of slipping or skidding of the tire is overcome.

What I claim as my invention is:—

A tire armor of the character described, comprising a plurality of substantially diamond-shaped plates overlapping and curved to fit the transverse curvature of the tire, the tread portion of each plate having one of its edges upturned to form a transversely extending anti-slipping projection and serve as a receptive space for the correlative movement of the end of the adjacent plate, the underneath portion of the said upturned edge engaging the adjacent plate only at the extremital point of the latter, a struck-up longitudinal anti-slipping projection arranged medially and at right angles to said first mentioned projection, and flexible connecting links for the terminals of said plates.

In testimony whereof I hereunto affix my signature in presence of two witnesses.

JAMES F. COOPER.

Witnesses:
A. O'DONNELL,
H. C. SCHROEDER.